US008808816B2

(12) United States Patent
Yamazaki et al.

(10) Patent No.: US 8,808,816 B2
(45) Date of Patent: Aug. 19, 2014

(54) COATING LIQUID, GAS-BARRIER MULTILAYER STRUCTURE AND GAS-BARRIER SHAPED ARTICLE THEREFROM, AND PROCESS FOR PRODUCING GAS-BARRIER MULTILAYER STRUCTURE

(75) Inventors: Masahiro Yamazaki, Omitama (JP); Chisato Fujimura, Omitama (JP); Katsumi Kawaguchi, Omitama (JP)

(73) Assignee: Toppan Printing Co., Ltd., Tokyo (JP)

( * ) Notice: Subject to any disclaimer, the term of this patent is extended or adjusted under 35 U.S.C. 154(b) by 1019 days.

(21) Appl. No.: 12/312,772

(22) PCT Filed: Sep. 28, 2007

(86) PCT No.: PCT/JP2007/069022
§ 371 (c)(1),
(2), (4) Date: May 27, 2009

(87) PCT Pub. No.: WO2008/068948
PCT Pub. Date: Jun. 12, 2008

(65) Prior Publication Data
US 2010/0068438 A1   Mar. 18, 2010

(30) Foreign Application Priority Data
Dec. 1, 2006   (JP) .................................. 2006-326062

(51) Int. Cl.
C09D 133/02 (2006.01)
C09D 7/12 (2006.01)
C09D 5/02 (2006.01)
C08K 3/22 (2006.01)

(52) U.S. Cl.
CPC .............. *C09D 133/02* (2013.01); *C08K 3/22* (2013.01); *C09D 7/1216* (2013.01); *C09D 5/024* (2013.01)
USPC ................... 428/35.7; 525/330.2; 525/329.7; 525/360; 525/366; 524/556

(58) Field of Classification Search
USPC ................. 428/35.7; 525/330.2, 329.7, 360, 525/366–373; 524/556
See application file for complete search history.

(56) References Cited

U.S. PATENT DOCUMENTS

| 5,175,054 | A  | * | 12/1992 | Chu ............................ 428/461 |
| 5,192,620 | A  | * | 3/1993  | Chu et al. .................... 428/461 |
| 5,560,988 | A  | * | 10/1996 | Oba et al. .................... 428/389 |
| 6,605,344 | B1 | * | 8/2003  | Ohba et al. .................. 428/332 |
| 7,435,446 | B2 | * | 10/2008 | Kamoshita .................... 427/335 |
| 7,476,712 | B2 | * | 1/2009  | Tanaka et al. ............. 525/330.2 |
| 7,501,176 | B2 | * | 3/2009  | Yamasaki et al. ............ 428/220 |
| 7,569,267 | B2 | * | 8/2009  | Tanaka et al. ................ 428/220 |
| 7,608,339 | B2 | * | 10/2009 | Yamazaki et al. ............ 428/500 |
| 7,763,676 | B2 | * | 7/2010  | Moncla et al. ................ 524/523 |
| 7,776,415 | B2 | * | 8/2010  | Inaba et al. .................. 428/35.7 |
| 7,807,272 | B2 | * | 10/2010 | Okura et al. .................. 428/522 |
| 2005/0131162 | A1 | * | 6/2005 | Tanaka et al. ............. 525/329.7 |
| 2006/0222793 | A1 | * | 10/2006 | Kashimura et al. .......... 428/35.7 |
| 2009/0053542 | A1 | * | 2/2009 | Kuwata et al. ............... 428/480 |
| 2009/0280333 | A1 | * | 11/2009 | Kuwata et al. ............. 428/423.7 |

FOREIGN PATENT DOCUMENTS

| JP | 2002-338821 | 11/2002 |
| JP | 2006-225551 | 2/2005 |
| WO | WO 03/091317 | 4/2003 |
| WO | 2004/108815 A2 | 12/2004 |
| WO | WO 2006/057177 | 11/2005 |
| WO | 2007/125741 A1 | 11/2007 |
| WO | 2007/125742 A1 | 11/2007 |

OTHER PUBLICATIONS

International Search Report of PCT/JP2007/069022 mailed Dec. 4, 2007.

* cited by examiner

*Primary Examiner* — Michele L Jacobson
(74) *Attorney, Agent, or Firm* — The Webb Law Firm

(57) ABSTRACT

Gas-barrier multilayer structures and gas-barrier shaped articles are sufficiently prevented from clouding even when exposed to cold water at 30° C. or below and have excellent gas barrier properties. Processes for producing such gas-barrier multilayer structures, and coating liquids (A) of excellent coating properties that are used to produce the multilayer structures are also provided. A coating liquid (A) includes a solvent mixture of water and an organic solvent and a polycarboxylic acid polymer partially neutralized with a polyvalent metal wherein the polymer is both dissolved and dispersed as particles in the solvent mixture and wherein the particles dispersed account for 5 to 80 wt% of 100 wt% of the polycarboxylic acid polymer partially neutralized with a polyvalent metal.

15 Claims, No Drawings

COATING LIQUID, GAS-BARRIER MULTILAYER STRUCTURE AND GAS-BARRIER SHAPED ARTICLE THEREFROM, AND PROCESS FOR PRODUCING GAS-BARRIER MULTILAYER STRUCTURE

FIELD OF THE INVENTION

The present invention relates to gas-barrier multilayer structures and gas-barrier shaped articles which are useful as packaging materials for products sensitive to oxygen or the like such as foods, beverages, chemicals, drugs and precision metal parts such as electronic components, or which are useful as packaging materials for products requiring high-temperature water treatment (heat sterilization) such as boiling and retort sterilization. The invention also relates to processes for producing such gas-barrier multilayer structures, and to coating liquids (A) used in the production processes.

BACKGROUND OF THE INVENTION

As Conventional gas-barrier polymers, polymers which have a highly hydrogen bonding group with high hydrophilicity, such as poly(meth) acrylic acid and polyvinyl alcohol, have been used. Films of these polymers show very high gas barrier properties against oxygen or the like under dry conditions. Under highly humid conditions, however, the gas barrier properties against oxygen or the like are drastically lowered and the films are poor in resistance to moisture or hot water because of the hydrophilicity.

To solve these problems, WO 03/091317 (Patent Document 1) discloses that a polycarboxylic acid polymer layer and a polyvalent metal compound-containing layer are formed adjacent to each other on a support film, and a polyvalent metal salt of polycarboxylic acid polymer is formed by interlayer reaction. The gas-barrier films thus produced are shown to have high oxygen barrier properties even under high humidity.

However, the gas-barrier films of Patent Document 1 reduce gas barrier properties or are clouded when exposed to cold water.

In regard to gas-barrier films that do not reduce gas barrier properties or are not clouded when exposed to cold water, the present applicant has filed patent applications directed to coating liquids containing a polycarboxylic acid polymer partially neutralized with a polyvalent metal (and an alkali metal) in which part of the carboxyl groups of the polycarboxylic acid polymer are neutralized with a polyvalent metal (and an alkali metal), and to gas-barrier films obtained from the coating liquids (Japanese Patent Application Nos. 2006-121602 and 2006-121604).

However, the coating liquids substantially disclosed in the above patent applications are often inferior in coating properties and require improvements.

Patent Document 1: WO 03/091317

DISCLOSURE OF THE INVENTION

The present invention has been made in view of the above problems in the art. It is therefore an object of the invention to provide gas-barrier multilayer structures and gas-barrier shaped articles that are useful as packaging materials such as heat sterilized packaging materials, and wherein even when the packaging materials are exposed to cold water at 30° C. or below, clouding is sufficiently prevented and excellent gas barrier properties are obtained. It is another object of the invention to provide processes for producing gas-barrier multilayer structures, and coating liquids (A) of excellent coating properties that are used to produce the multilayer structures.

The present inventors diligently studied to achieve the above objects and have found that a coating liquid (A) described below which contains a polycarboxylic acid polymer partially neutralized with a polyvalent metal shows high coating properties, and that gas-barrier multilayer structures and gas-barrier shaped articles produced using the coating liquid (A) are sufficiently prevented from clouding even when exposed to cold water at 30° C. or below and achieve excellent gas barrier properties. The present invention has been completed based on the findings.

A coating liquid (A) according to the present invention comprises a solvent mixture of water and an organic solvent and a polycarboxylic acid polymer partially neutralized with a polyvalent metal wherein the polymer is both dissolved and dispersed as particles in the solvent mixture and wherein the particles dispersed account for 5 to 80 wt % of 100 wt % of the polycarboxylic acid polymer partially neutralized with a polyvalent metal.

The particles dispersed preferably have an average particle diameter of 500 to 4000 nm.

The coating liquid (A) preferably has a contact angle of not more than 70° with respect to a polypropylene resin (an unstretched polypropylene homopolymer film having a melting point of 158 to 162° C. and a density of 0.88 to 0.92 g/cm$^3$) as measured by a θ/2 method.

The polycarboxylic acid polymer partially neutralized with a polyvalent metal may be a reaction product of a polycarboxylic acid polymer with 0.05 to 0.30 chemical equivalent of a polyvalent metal compound based on the carboxyl groups in the polycarboxylic acid polymer.

The polycarboxylic acid polymer partially neutralized with a polyvalent metal may be a reaction product of a polycarboxylic acid polymer with 0.01 to 0.35 chemical equivalent of an alkali metal compound based on the carboxyl groups in the polycarboxylic acid polymer and 0.05 to 0.75 chemical equivalent of a polyvalent metal compound based on the carboxyl groups in the polycarboxylic acid polymer (wherein the total of the alkali metal compound and the polyvalent metal compound does not exceed 1.00 chemical equivalent).

The polycarboxylic acid polymer is preferably a (co)polymer of at least one polymerizable monomer selected from acrylic acid, maleic acid, methacrylic acid and itaconic acid, or a mixture of such (co)polymers.

The polyvalent metal compound is preferably a calcium compound or a zinc compound.

Preferably, the alkali metal compound is a potassium compound or a sodium compound, and the polyvalent metal compound is a calcium compound or a zinc compound.

Preferably, the organic solvent is at least one organic solvent selected from the group consisting of C1-5 lower alcohols and C3-5 lower ketones, and the solvent mixture contains water at 20 to 95 wt % and the organic solvent at 80 to 5 wt % (wherein the total of water and the organic solvent is 100 wt %).

An aspect of the present invention is directed to a gas-barrier multilayer structure comprising a support and a gas-barrier layer (a) on at least one surface of the support wherein the gas-barrier layer is formed from the coating liquid (A).

Another aspect of the present invention is directed to a gas-barrier multilayer structure comprising a support and a laminate unit on at least one surface of the support wherein the laminate unit comprises a gas-barrier layer (a) formed from the coating liquid (A) and a polyvalent metal compound-containing layer (b) in contact with each other.

The polyvalent metal compound-containing layer (b) is preferably formed from a coating liquid (B) containing a polyvalent metal compound.

An aspect of the present invention is directed to a gas-barrier shaped article comprising the multilayer structure and having a shape selected from the group consisting of films, sheets, bottles, cups and trays.

An aspect of the invention is directed to a process for producing gas-barrier multilayer structures which comprises applying the coating liquid (A) on at least one surface of a support and drying the liquid to form a gas-barrier layer (a).

Another aspect of the invention is directed to a process for producing gas-barrier multilayer structures which comprises applying the coating liquid (A) on at least one surface of a support; drying the liquid to form a gas-barrier layer (a); applying a coating liquid (B) containing a polyvalent metal compound on the gas-barrier layer (a); and drying the Liquid to form a polyvalent metal compound-containing layer (b) on the gas-barrier layer (a).

ADVANTAGES OF THE INVENTION

The coating liquids according to the present invention have excellent coating properties. The gas-barrier multilayer structures and gas-barrier shaped articles produced using the coating liquids are sufficiently prevented from clouding even when exposed to cold water at 30° C. or below in applications involving heat sterilization and achieve excellent gas barrier properties. Accordingly, the gas-barrier multilayer structures and gas-barrier shaped articles may be used as packaging materials that are subjected to heat sterilization.

The production processes of the present invention provide the above gas-barrier multilayer structures and gas-barrier shaped articles.

PREFERRED EMBODIMENTS OF THE INVENTION

The present invention will be described in detail hereinbelow.

<Coating Liquids (A)>

A coating liquid (A) according to the present invention includes a solvent mixture of water and an organic solvent and a polycarboxylic acid polymer partially neutralized with a polyvalent metal wherein the polymer is both dissolved and dispersed as particles in the solvent mixture and wherein the particles dispersed account for 5 to 80 wt % of 100 wt % of the polycarboxylic acid polymer partially neutralized with a polyvalent metal. If the particles dispersed account for less than 5 wt %, coating properties may be deteriorated. If the dispersed particle content exceeds 80 wt %, the coating liquid (A) is unstable and affected by temperature of the like (the coating liquid (A) may increase the viscosity or aggregates may be precipitated).

Based on 100 wt % of the polycarboxylic acid polymer partially neutralized with a polyvalent metal, 95 to 20 wt % of the polycarboxylic acid polymer partially neutralized with a polyvalent metal is dissolved in the solvent mixture.

From the viewpoints of long-term stability, coating properties and film-forming properties after the coating liquid (A) is applied and dried, it is more preferable that based on 100 wt % of the polycarboxylic acid polymer partially neutralized with a polyvalent metal, 10 to 70 wt % of the polycarboxylic acid polymer partially neutralized with a polyvalent metal is dispersed as particles and 90 to 30 wt % is dissolved in the solvent mixture. Particularly preferably, 15 to 60 wt % of the polycarboxylic acid polymer partially neutralized with a polyvalent metal is dispersed as particles and 85 to 40 wt % is dissolved in the solvent mixture.

(Solvent Mixture of Water and Organic Solvent)

The solvent mixture of water and an organic solvent acts as a solvent to dissolve the polycarboxylic acid polymer partially neutralized with a polyvalent metal as described later and also as a dispersion medium in which 5 to 80 wt % based on 100 wt % of the polycarboxylic acid polymer partially neutralized with a polyvalent metal is dispersed as particles.

In an embodiment of the solvent mixture of water and an organic solvent, the organic solvent is at least one organic solvent selected from the group consisting of C1-5 lower alcohols and C3-5 lower ketones, and the solvent mixture contains water at 20 to 95 wt % and the organic solvent at 80 to 5 wt % (wherein the total of water and the organic solvent is 100 wt %).

If the amount of the organic solvents exceeds 80 wt %, the coating liquid (A) is unstable and affected by temperature of the like (the coating liquid (A) may increase the viscosity or aggregates may be precipitated). If the amount is less than 5 wt %, coating properties may be deteriorated. From the viewpoints of long-term stability and film-forming properties after the coating liquid (A) is applied and dried, the solvent mixture preferably contains the organic solvent at 70 to 8 wt % and water at 30 to 92 wt %, and particularly preferably the organic solvent at 60 to 10 wt % and water at 40 to 90 wt %.

Of the organic solvents, methyl alcohol, ethyl alcohol, n-propyl alcohol, isopropyl alcohol and acetone provide excellent coating properties.

From the viewpoints of productivity and safety, isopropyl alcohol is more preferable. The organic solvents may be used singly, or two or more kinds may be used in combination.

(Polycarboxylic Acid Polymers Partially Neutralized with Polyvalent Metal)

The polycarboxylic acid polymers partially neutralized with a polyvalent metal may be neutralized products of polycarboxylic acid polymers wherein the carboxyl groups are partially neutralized with polyvalent metal compounds or wherein the carboxyl groups are partially or completely neutralized with polyvalent metal compounds and alkali metals.

The neutralized products of polycarboxylic acid polymers wherein the carboxyl groups are partially or completely neutralized with alkali metals and polyvalent metals are sometimes referred to as the alkali metal/polyvalent metal-partially neutralized polycarboxylic acid polymers.

<Polycarboxylic Acid Polymers>

The polycarboxylic acid polymers used in the invention are polymers of polymerizable polycarboxylic acid monomers and have two or more carboxyl groups in the molecule. Examples of the polycarboxylic acid polymers include (co)polymers of ethylenically unsaturated carboxylic acids; copolymers of ethylenically unsaturated carboxylic acids and other ethylenically unsaturated monomers; and acidic polysaccharides having carboxyl groups in the molecule such as alginic acid, carboxymethylcellulose and pectin. The polycarboxylic acid polymers may be used singly, or two or more kinds may be used in combination.

Examples of the ethylenically unsaturated carboxylic acids include acrylic acid, methacrylic acid, itaconic acid, maleic acid, fumaric acid and crotonic acid. Examples of the ethylenically unsaturated monomers copolymerizable with these ethylenically unsaturated carboxylic acids include ethylene, propylene, saturated vinyl carboxylates such as vinyl acetate, alkyl acrylates, alkyl methacrylates, alkyl itaconates, vinyl chloride, vinylidene chloride, styrene, acrylamide and acrylonitrile.

From the viewpoint of gas barrier properties of the obtainable gas-barrier multilayer structures and gas-barrier shaped articles, it is preferable that the polycarboxylic acid polymer is a (co)polymer of at least one polymerizable monomer selected from acrylic acid, maleic acid, methacrylic acid, itaconic acid, fumaric acid and crotonic acid, or a mixture of such (co)polymers; it is particularly preferable that the polycarboxylic acid polymer is a (co)polymer of at least one polymerizable monomer selected from acrylic acid, maleic acid, methacrylic acid and itaconic acid, or a mixture of such (co)polymers.

From the viewpoints of gas barrier properties and stability of films against hot vapor or hot water, the polycarboxylic acid polymers for use in the present invention preferably satisfy the condition that a film from the polymer alone has an oxygen permeability coefficient at 30° C. and 0% RH of not more than 1000 $cm^3$ (STP)·µm/$m^2$·day·MPa, preferably not more than 500 $cm^3$ (STP)·µm/$m^2$·day·MPa, more preferably not more than 100 $cm^3$ (STP)·µm/$m^2$·day·MPa, and particularly preferably not more than 70 $cm^3$ (STP)·µm/$m^2$·day·MPa. The oxygen permeability coefficient at 30° C. and 0% RH may be obtained by multiplying the oxygen permeability at 30° C. and 0% RH (unit: $cm^3$ (STP)/$m^2$·day·MPa) by the thickness of the film (unit: µm).

It is necessary that the polycarboxylic acid polymers used in the invention have a number average molecular weight of 2,000 to 10,000,000. If the number average molecular weight is less than 2,000, the obtainable gas-barrier multilayer structures and gas-barrier shaped articles fail to achieve sufficient water resistance and may be clouded or deteriorated in gas barrier properties or transparency by water. If the number average molecular weight exceeds 10,000,000, the obtainable coating liquid (A) will have so high a viscosity that coating properties will be deteriorated. From the viewpoint of water resistance of the obtainable gas-barrier multilayer structures and gas-barrier shaped articles, the number average molecular weight of the polycarboxylic acid polymers is preferably in the range of 30,000 to 5,000,000, and particularly preferably 100,000 to 3,000,000.

The number average molecular weight may be determined by gel permeation chromatography (GPC) relative to polystyrene standards.

The polycarboxylic acid polymers may be used singly, or two or more kinds may be used in combination.

<Polyvalent Metal Compounds>

The polyvalent metal compounds used in the invention have metal ions with a valence of two or greater. The polyvalent metals contained in the polyvalent metal compounds include alkaline earth metals such as beryllium, magnesium and calcium; transition metals such as titanium, zirconium, chromium, manganese, iron, cobalt, nickel, copper and zinc; and aluminum. From the viewpoints of water resistance and transparency, calcium compounds or zinc compounds are preferably used. Examples of the polyvalent metal compounds include oxides, hydroxides, carbonates, organic acid salts and inorganic acid salts of the above polyvalent metals; ammonium complexes or secondary to quaternary amine complexes of the polyvalent metal oxides, and carbonates and organic acid salts thereof; and alkyl alkoxides of the above polyvalent metals.

From the viewpoints of gas barrier properties, resistance to hot vapor and hot water and productivity, bivalent metal compounds are preferable; and oxides, hydroxides, chlorides and carbonates of alkaline earth metals, cobalt, nickel, copper or zinc, and ammonium complexes of copper or zinc and carbonates thereof are preferably used.

In view of industrial productivity, calcium hydroxide, calcium carbonate and zinc oxide are particularly preferable.

The polyvalent metal compounds may be in the form of particles or other than particles. In view of solubility, the particle form is preferable. The average particle diameter of such particles is not particularly limited, but in view of solubility is preferably not more than 50 µm, more preferably not more than 30 µm, and particularly preferably not more than 10 µm. The average particle diameter may be determined with, for example, a submicron particle size analyzer (Coulter N4 Plus) manufactured by Beckman Coulter, Inc.

<Alkali Metal Compounds>

The alkali metal compounds used in the invention are not particularly limited. The alkali metals contained in the alkali metal compounds include lithium, sodium, potassium, rubidium, cesium and francium. Examples of the alkali metal compounds include oxides, hydroxides, carbonates, organic acid salts and inorganic acid salts of these alkali metals. The organic acid salts may be formates, acetates, oxalates, citrates and lactates. The inorganic acid salts may be chlorides, sulfates and nitrates.

Of the alkali metal compounds, the sodium compounds and potassium compounds are preferable, and sodium or potassium hydroxide and sodium or potassium carbonate are more preferable from the viewpoint of gas barrier properties of the obtainable gas-barrier multilayer structures and gas-barrier shaped articles.

The alkali metal compounds may be in the form of particles or other than particles. In view of solubility, the particle form is preferable. The average particle diameter of such particles is not particularly limited, but in view of solubility is preferably not more than 1 cm, and more preferably not more than 7 mm.

The polyvalent metal-partially neutralized polycarboxylic acid polymers may be reaction products of the polycarboxylic acid polymers and the polyvalent metal compounds, or may be reaction products of the polycarboxylic acid polymers, the polyvalent metal compounds and the alkali metal compounds.

When the polyvalent metal-partially neutralized polycarboxylic acid polymer is obtained by reacting the polycarboxylic acid polymer and the polyvalent metal compound, it is preferable that the reaction involves 0.05 to 0.30 chemical equivalent, more preferably 0.07 to 0.28 chemical equivalent, and particularly preferably 0.10 to 0.25 chemical equivalent of the polyvalent metal compound based on the carboxyl groups in the polycarboxylic acid polymer.

If the chemical equivalent of the polyvalent metal compound is less than 0.05, the gas-barrier layer (a) that is obtained by applying and drying the coating liquid may show deteriorated water resistance. If the chemical equivalent exceeds 0.30, the coating liquid (A) may have poor stability.

When the polyvalent metal-partially neutralized polycarboxylic acid polymer is obtained by reacting the polycarboxylic acid polymer, the polyvalent metal compound and the alkali metal compound, it is preferable that the reaction involves 0.01 to 0.35 chemical equivalent of the alkali metal compound based on the carboxyl groups in the polycarboxylic acid polymer and 0.05 to 0.75 chemical equivalent of the polyvalent metal compound based on the carboxyl groups in the polycarboxylic acid polymer (wherein the total of the alkali metal compound and the polyvalent metal compound does not exceed 1.00 chemical equivalent). From the viewpoints of water resistance of the gas-barrier layer (a) and stability of the coating liquid (A), it is more preferable that the chemical equivalent of the alkali metal compound is 0.02 to 0.25 and that of the polyvalent metal compound is 0.10 to 0.50. Using the alkali metal compound in the above chemical equivalent permits the polyvalent metal compound to be used in an increased amount as compared to when no alkali metal compounds are used. If the chemical equivalent of the alkali metal compound exceeds 0.35, the obtainable films may show poor water resistance. If the chemical equivalent of the polyvalent metal compound is less than 0.05, the gas-barrier layer (a) that is obtained by applying and drying the coating liquid may have poor water resistance; if the chemical equivalent exceeds 0.75, the coating liquid (A) may show poor stability.

Hereinbelow, there will be described exemplary methods for preparing the coating liquids (A) in which the polyvalent metal-partially neutralized polycarboxylic acid polymer is both dissolved and dispersed as particles in the solvent mixture of water and the organic solvent.

When the polyvalent metal-partially neutralized polycarboxylic acid polymer is a reaction product of the polycarboxylic acid polymer and the polyvalent metal compound, the coating liquids may be prepared by for example the following methods: (1) An aqueous solution of the polycarboxylic acid polymer, an aqueous dispersion of the polyvalent metal compound and the organic solvent are mixed together by stirring. (2) An aqueous solution of the polycarboxylic acid polymer and a dispersion of the polyvalent metal compound (in a solvent mixture of water and the organic solvent) are mixed together by stirring. (3) A solution of the polycarboxylic acid polymer (in a solvent mixture of water and the organic solvent) and a dispersion of the polyvalent metal compound (in a solvent mixture of water and the organic solvent) are mixed together by stirring. (4) An aqueous solution of the polycarboxylic acid polymer is mixed with the polyvalent metal compound and the organic solvent by stirring. (5) A solution of the polycarboxylic acid polymer (in a solvent mixture of water and the organic solvent) is mixed with the polyvalent metal compound by stirring.

In view of productivity, the method (1) is most preferable. The method (1) for preparing the coating liquid (A) will be described in detail below.

Water is added to the polycarboxylic acid polymer (or an aqueous solution of the polymer) to give an aqueous polycarboxylic acid polymer solution. Separately, the polyvalent metal compound is added to water to form an aqueous dispersion of the polyvalent metal compound. While the aqueous polycarboxylic acid polymer solution is stirred, the aqueous dispersion of the polyvalent metal compound is added thereto and stirred therewith for several hours to several days, thereby preparing an aqueous solution of the polycarboxylic acid polymer partially neutralized with the polyvalent metal. While the aqueous solution of the polyvalent metal-partially neutralized polycarboxylic acid polymer is stirred, the organic solvent is added thereto and stirred therewith for several hours to several days to afford the coating liquid (A).

When the polyvalent metal-partially neutralized polycarboxylic acid polymer is a reaction product of the polycarboxylic acid polymer, the polyvalent metal compound and the alkali metal compound, the coating liquids may be prepared by for example the following methods: (6) The polycarboxylic acid polymer (or an aqueous solution of the polymer) and the alkali metal compound are added to water to give an aqueous solution of the polycarboxylic acid polymer partially neutralized with the alkali metal. The aqueous solution of the alkali metal-partially neutralized polycarboxylic acid polymer, an aqueous dispersion of the polyvalent metal compound and the organic solvent are mixed together by stirring. (7) The polycarboxylic acid polymer (or an aqueous solution of the polymer) and the alkali metal compound are added to water to give an aqueous solution of the polycarboxylic acid polymer partially neutralized with the alkali metal. The aqueous solution of the alkali metal-partially neutralized polycarboxylic acid polymer, and a dispersion of the polyvalent metal compound (in a solvent mixture of water and the organic solvent) are mixed together by stirring. (8) The polycarboxylic acid polymer (or an aqueous solution of the polymer) and the alkali metal compound are added to a solvent mixture of water and the organic solvent to give a solution of the polycarboxylic acid polymer partially neutralized with the alkali metal. The solution of the alkali metal-partially neutralized polycarboxylic acid polymer (in the solvent mixture of water and the organic solvent) and a dispersion of the polyvalent metal compound (in a solvent mixture of water and the organic solvent) are mixed together by stirring. (9) The polycarboxylic acid polymer (or an aqueous solution of the polymer) and the alkali metal compound are added to water to give an aqueous solution of the polycarboxylic acid polymer partially neutralized with the alkali metal. The aqueous solution of the alkali metal-partially neutralized polycarboxylic acid polymer is mixed with the polyvalent metal compound and the organic solvent by stirring. (10) The polycarboxylic acid polymer (or an aqueous solution of the polymer) and the alkali metal compound are added to water to give an aqueous solution of the polycarboxylic acid polymer partially neutralized with the alkali metal. The solution of the alkali metal-partially neutralized polycarboxylic acid polymer (in a solvent mixture of water and the organic solvent) is mixed with the polyvalent metal compound by stirring.

In view of productivity, the method (6) is most preferable. The method (6) for preparing the coating liquid (A) will be described in detail below.

The polycarboxylic acid polymer (or an aqueous solution of the polymer) and the alkali metal compound are added to water to give an aqueous solution of the polycarboxylic acid polymer partially neutralized with the alkali metal. Separately, the polyvalent metal compound is added to water to form an aqueous dispersion of the polyvalent metal compound. While the aqueous solution of the alkali metal-partially neutralized polycarboxylic acid polymer is stirred, the aqueous dispersion of the polyvalent metal compound is added thereto and stirred therewith for several hours to several days, thereby preparing an aqueous solution of the polycarboxylic acid polymer partially neutralized with the alkali metal and the polyvalent metal. While the aqueous solution of the alkali metal/polyvalent metal-partially neutralized polycarboxylic acid polymer is stirred, the organic solvent is added thereto and stirred therewith for several hours to several days to afford the coating liquid (A).

In the coating liquids (A) of the invention, the content of the polyvalent metal-partially neutralized polycarboxylic acid polymer is preferably 0.1 to 30 wt % based on 100 wt % of the coating liquid (A). If the content is less than 0.1 wt %, the obtainable gas-barrier multilayer structures and gas-barrier shaped articles may fail to achieve sufficient gas barrier properties. If the content exceeds 30 wt %, the coating liquid (A) is unstable and may fail to form uniform multilayer structures or shaped articles.

From the viewpoints of stability and coatability of the coating liquid (A), the content of the polyvalent metal-partially neutralized polycarboxylic acid polymer is more preferably 0.5 to 20 wt %, and particularly preferably 1 to 10 wt % based on 100 wt % of the coating liquid (A).

In the coating liquids (A) of the invention, the polyvalent metal-partially neutralized polycarboxylic acid polymer is partly dispersed as particles in the solvent mixture of water and the organic solvent. The proportion of such particles based on 100 wt % of the polyvalent metal-partially neutralized polycarboxylic acid polymer is 5 to 80 wt %, preferably 10 to 70 wt %, and particularly preferably 15 to 60 wt %.

In the invention, the proportion (wt %) of the dispersed particles based on 100 wt % of the polyvalent metal-partially neutralized polycarboxylic acid polymer may be obtained by the following method.

The coating liquid (A) is centrifuged at 25,000 rpm (centrifugal acceleration: about 50,000 G) for 150 minutes, whereby the liquid is separated into a supernatant liquid and a white turbid precipitate of dispersed particles. The white turbid precipitate and the supernatant liquid are separated from each other and are each dried in vacuo at 90° C. for a day and then weighed. The weights obtained are applied to Equation (1) below to calculate the proportion of the particles of polyvalent metal-partially neutralized polycarboxylic acid polymer dispersed in the coating liquid (A):

[Formula 1]

$$\text{Proportion of dispersed particles of polyvalent metal-partially neutralized polycarboxylic acid polymer [wt \%]} = \frac{\text{Dry weight of white turbid precipitate [g]}}{\left(\begin{array}{c}\text{Dry weight of white turbid precipitate [g]} + \\ \text{dry weight of supernatant liquid [g]}\end{array}\right)} \times 100 \text{ [wt \%]} \quad (1)$$

From the viewpoints of long-term stability, coating properties and film-forming properties after the coating liquid (A) is applied and dried, the average particle diameter of the dispersed particles is preferably 500 to 4000 nm, and more preferably 600 to 3500 nm.

The average particle diameter of the particles dispersed in the coating liquid (A) may be determined as follows. The average particle diameter of the dispersed particles in the coating liquid (A) is measured on a submicron particle size analyzer at a scattering angle of 62.5°. In the measurement of the average particle diameter, the coating liquid (A) is generally diluted with the solvent mixture used to prepare the coating liquid (A). The coating liquid is preferably diluted so that the content of the polyvalent metal-partially neutralized polycarboxylic acid polymer will be in the range of 0.005 to 0.020 wt %.

The coating liquid (A) preferably has a contact angle of not more than 70°, more preferably not more than 60°, and particularly preferably not more than 55° with respect to a polypropylene resin (an unstretched polypropylene homopolymer film having a melting point of 158 to 162° C. and a density of 0.88 to 0.92 g/cm³) as measured by a θ/2 method. This contact angle ensures that the coating liquid (A) shows excellent coating properties and can be applied on a support stably without uneven coating.

The coating liquids (A) may appropriately contain additives such as resins, dispersants, surfactants, softeners, stabilizers, antiblocking agents, film-forming agents and tackifiers.

<Gas-Barrier Multilayer Structures and Gas-Barrier Shaped Articles>

The gas-barrier multilayer structures and gas-barrier shaped articles of the present invention will be described next.

The gas-barrier multilayer structures according to the invention have a support described later and a gas-barrier layer (a) formed from the coating liquid (A).

In an embodiment, the gas-barrier multilayer structure has a support described later and a gas-barrier layer (a) on at least one surface of the support wherein the gas-barrier layer is formed from the coating liquid (A). In another embodiment, the gas-barrier multilayer structure has a support and a laminate unit on at least one surface of the support wherein the laminate unit includes a gas-barrier layer (a) formed from the coating liquid (A) and a polyvalent metal compound-containing layer (b) in contact with each other.

The gas-barrier multilayer structures of the invention show excellent gas barrier properties because of the gas-barrier layer (a) formed from the coating liquid (A), and are highly resistant to water due to the polycarboxylic acid polymer partially neutralized with the polyvalent metal.

The gas-barrier multilayer structures may be laminated with plastic films for the purpose of increased strength, sealing properties, easy opening from the sealed state, design, light shielding or moisture proofness.

The gas-barrier shaped articles of the present invention are comprised of the above gas-barrier multilayer structures and have a shape selected from the group consisting of films, sheets, bottles, cups and trays.

(Supports)

The supports used in the invention are substrates on which the gas-barrier layer (a) from the coating liquid (A) and the polyvalent metal compound-containing layer (b) are sequentially laminated. The supports are not particularly limited and may be for example films, sheets, bottles, cups or trays.

The thickness of the support may vary depending on applications but is generally from 5 μm to 1 mm. For use as films or sheets, the support thickness is preferably 5 to 150 μm, and more preferably 10 to 100 μm. For use as bottles or trays, the support thickness is preferably 100 to 300 μm, and more preferably 150 to 250 μm.

The support thickness in the above ranges ensures excellent workability and productivity in the respective applications.

The materials of the supports include metals, glasses, papers and plastics (including metal-deposited plastics). Examples of the plastics include polyolefin polymers such as low-density polyethylene, high-density polyethylene, linear low-density polyethylene, polypropylene, poly-4-methylpentene and cyclic polyolefins, and copolymers thereof and acid-modified products of these polymers; polyvinyl acetate and vinyl acetate copolymers such as ethylene/vinyl acetate copolymer, saponified ethylene/vinyl acetate copolymer and polyvinyl alcohols; polyester polymers such as polyethylene terephthalate, polybutylene terephthalate, polyethylene naphthalate, poly-ε-caprolactone, polyhydroxybutyrate and polyhydroxyvalerate, and copolymers thereof; polyamide polymers and copolymers such as nylon 6, nylon 66, nylon 12, nylon 6/nylon 66 copolymer, nylon 6/nylon 12 copolymer and meta-xylene adipamide/nylon 6 copolymer; polyether polymers such as polyethylene glycol, polyether sulfone, polyphenylene sulfide and polyphenylene oxide; chloride or fluoride polymers such as polyvinyl chloride, polyvinylidene chloride, polyvinyl fluoride and polyvinylidene fluoride, and copolymers thereof; acrylic polymers such as polymethyl acrylate, polyethyl acrylate, polymethyl methacrylate, polyethyl methacrylate and polyacrylonitrile, and copolymers thereof; polyimide polymers and copolymers; resins such as alkyd resins, melamine resins, acrylic resins, cellulose nitrate, urethane resins, unsaturated polyester resins, phenolic resins, amino resins, fluororesins and epoxy resins used in coating materials; and natural high-molecular weight compounds such as cellulose, starch, pullulan, chitin, chitosan, glucomannan, agarose and gelatin.

To improve adhesion between the support and the gas-barrier layer (a) from the coating liquid (A) or the polyvalent metal compound-containing layer (b), the support may be surface-treated by corona treatment, flame treatment or plasma treatment whereby the surface of the support is activated. Further, an adhesive layer may be provided on the surface of the support. Resins used in the adhesive layers are not particularly limited and may be any resins used in dry laminates, anchor coatings or primers. Examples of the resins include alkyd resins, melamine resins, acrylic resins, cellulose nitrate, urethane resins, polyester resins, phenolic resins, amino resins, fluororesins and epoxy resins.

In the invention, adhesive layers that are formed from resins used as anchor coatings will be also referred to as the anchor coating layers.

(Gas-Barrier Layers (a) Formed from Coating Liquids (A))

The gas-barrier layer (a) from the coating liquid (A) that constitutes the gas-barrier multilayer structures of the invention may be formed by applying the coating liquid (A) on the support or the polyvalent metal compound-containing layer (b) and drying the coating.

(Polyvalent Metal Compound-Containing Layers (b))

The polyvalent metal compound-containing layer (b) that constitutes the gas-barrier multilayer structures of the invention may be formed by depositing a polyvalent metal compound on the support or the gas-barrier layer (a) from the coating liquid (A) by gas-phase coating methods such as evaporation coating, sputtering and ion plating. Generally, it may be formed by applying and drying a coating liquid (B) described below.

(Coating Liquids (B))

The coating liquids (B) contain a polyvalent metal compound. The polyvalent metal compounds may be those used in the coating liquids (A). In the coating liquids (B), the polyvalent metal compounds are preferably particles. The average particle diameter of the particles of the polyvalent metal compounds may be similar to that of the polyvalent metal compounds in the coating liquids (A). From the viewpoints of gas barrier properties and coatability, the average particle diameter is preferably not more than 5 µm, more preferably not more than 1 µm, and particularly preferably not more than 0.1 µm.

Exemplary solvents for use in the coating liquids (B) include water, methyl alcohol, ethyl alcohol, isopropyl alcohol, n-propyl alcohol, n-butyl alcohol, n-pentyl alcohol, dimethylsulfoxide, dimethylformamide, dimethylacetamide, toluene, hexane, heptane, cyclohexane, acetone, methyl ethyl ketone, diethyl ether, dioxane, tetrahydrofuran, ethyl acetate and butyl acetate. Of these, methyl alcohol, ethyl alcohol, isopropyl alcohol, toluene and ethyl acetate are preferable in view of coating properties. From the viewpoint of productivity, methyl alcohol, ethyl alcohol, isopropyl alcohol and water are preferable. Because the gas-barrier layer (a) from the coating liquid (A) that constitutes the gas-barrier multilayer structures has excellent water resistance, water may be used as a solvent in the coating liquid (B). The solvents may be used singly, or two or more kinds may be used in combination.

The coating liquids (B) may appropriately contain additives such as resins, dispersants, surfactants, softeners, stabilizers, film-forming agents, antiblocking agents and tackifiers.

To improve coating properties and film-forming properties, it is preferable to mix the coating liquid (B) with a resin that is soluble or dispersible in the solvent system used. Examples of the resins soluble or dispersible in the solvent system of the invention include resins used in coating materials such as alkyd resins, melamine resins, acrylic resins, cellulose nitrate, urethane resins, polyester resins, phenolic resins, amino resins, fluororesins and epoxy resins.

To improve dispersibility of the polyvalent metal compounds, it is preferable to mix the coating liquid (B) with a dispersant that is soluble or dispersible in the solvent system used. Examples of the dispersants soluble or dispersible in the solvent system of the invention include acrylamide, acrylic acid, acrylic esters, neutralized acrylic acid, acrylonitrile, adipic acid, adipic acid esters, neutralized adipic acid, azelaic acid, abietic acid, aminododecanoic acid, arachidic acid, allylamine, arginine, argininic acid, albumin, ammonia, itaconic acid, itaconic acid esters, neutralized itaconic acid, ethylene oxide, ethylene glycol, ethylene diamine, oleic acid, kaolin, casein, caprylic acid, caprolactam, xanthan gum, citric acid, glycine, cristobalite, glycerin, glycerin esters, glucose, crotonic acid, silicic acid, saccharose, salicylic acid, cycloheptene, oxalic acid, starch, stearic acid, sebacic acid, cellulose, ceresin, sorbitan oleate, sorbitan stearate, sorbitan palmitate, sorbitan behenate, sorbitan laurate, sorbitol, sorbic acid, talc, dextrin, terephthalic acid, dolomite, nitrocellulose, urea, vermiculite, palmitic acid, pinene, phthalic acid, fumaric acid, propionic acid, propylene glycol, hexamethylenediamine, pectin, behenic acid, benzyl alcohol, benzoic acid, benzoates, benzoguanamine, pentaerythritol, bentonite, boric acid, polydimethylsiloxane, polyvinyl alcohol, mica, maleic acid, maleic acid esters, neutralized maleic acid, malonic acid, mannitol, myristic acid, methacrylic acid, methyl cellulose, coconut oil, eugenol, butyric acid, lignocellulose, lysine, malic acid, phosphoric acid, lecithin, rosin, wax, and polymers and copolymers of these substances.

In view of coatability, it is preferable that the coating liquid (B) contains the polyvalent metal compound and additives in a total amount of 1 to 50 wt %, more preferably 3 to 45 wt %, and particularly preferably 5 to 40 wt % based on the weight of the coating liquid (B).

Representative embodiments of the gas-barrier multilayer structures of the invention will be described below wherein an embodiment (C) shows a multilayer structure in which the gas-barrier layer (a) is formed from the coating liquid (A) on at least one surface of the support, and an embodiment (D) describes a multilayer structure in which a laminate unit is formed on at least one surface of the support wherein the laminate unit includes the gas-barrier layer (a) from the coating liquid (A) and the polyvalent metal compound-containing layer (b) in contact with each other.

<Gas-Barrier Multilayer Structures (C)>

The gas-barrier multilayer structures (C) have the support and the gas-barrier layer (a) from the coating liquid (A) on at least one surface of the support.

From the viewpoints of gas barrier properties and productivity of the gas-barrier multilayer structures (C), the gas-barrier layer (a) from the coating liquid (A) preferably has a thickness in the range of 0.01 to 10 µm, more preferably 0.05 to 5 µm, and particularly preferably 0.05 to 1 µm. In the gas-barrier multilayer structures (C), the oxygen permeability at 30° C. and 0% RH is generally not more than 1000 cm$^3$ (STP)/m$^2$·day·MPa, preferably not more than 500 cm$^3$ (STP)/m$^2$·day·MPa, more preferably not more than 100 cm$^3$ (STP)/m$^2$·day·MPa, and particularly preferably not more than 70 cm$^3$ (STP)/m$^2$·day·MPa.

<Gas-Barrier Multilayer Structures (D)>

The gas-barrier multilayer structures (D) have the support and a laminate unit on at least one surface of the support wherein the laminate unit includes the gas-barrier layer (a) from the coating liquid (A) and the polyvalent metal compound-containing layer (b) in contact with each other.

From the viewpoints of gas barrier properties and productivity of the gas-barrier multilayer structures (D), the gas-barrier layer (a) from the coating liquid (A) preferably has a thickness in the range of 0.01 to 10 µm, more preferably 0.05 to 5 µm, and particularly preferably 0.05 to 1 µm. The thickness of the polyvalent metal compound-containing layer (b) is preferably 0.01 to 10 µm, more preferably 0.05 to 5 µm, and particularly preferably 0.05 to 1 µm.

In the gas-barrier multilayer structures (D), the laminate unit of the gas-barrier layer (a) from the coating liquid (A) and the polyvalent metal compound-containing layer (b) is not particularly limited as long as the gas-barrier layer (a) from the coating liquid (A) and the polyvalent metal compound-containing layer. (b) are in contact with each other. For example, these layers may be formed on the surface of the support in the order of (a)/(b), (b)/(a), (a)/(b)/(a), or (b)/(a)/(b).

In the gas-barrier multilayer structures (D), the oxygen permeability at 30° C. and 0% RH is generally not more than 1000 $cm^3$ $(STP)/m^2 \cdot day \cdot MPa$, preferably not more than 500 $cm^3$ $(STP)/m^2 \cdot day \cdot MPa$, more preferably not more than 100 $cm^3$ $(STP)/m^2 \cdot day \cdot MPa$, and particularly preferably not more than 70 $cm^3$ $(STP)/m^2 \cdot day \cdot MPa$.

The gas-barrier multilayer structures (D) may be suitably used as packaging materials for products sensitive to oxygen or the like such as foods, beverages, chemicals, drugs and precision metal parts such as electronic components, or for products requiring high-temperature water treatment (heat sterilization) such as boiling and retort sterilization, or may be used as packaging bodies for these products. Even when the packaging materials such as heat sterilized packaging materials, are exposed to cold water at 30° C. or below, clouding is sufficiently prevented and excellent gas barrier properties and transparency are obtained. Accordingly, the gas-barrier multilayer structures are particularly suited for use as packaging materials in applications requiring heat sterilization.

In view of storage of contents, the gas-barrier multilayer structures (D) preferably have an oxygen permeability in humid atmosphere at 30° C. and 80% RH of not more than 100 $cm^3$ $(STP)/m^2 \cdot day \cdot MPa$, more preferably not more than 70 $cm^3$ $(STP)/m^2 \cdot day \cdot MPa$, and particularly preferably not more than 50 $cm^3$ $(STP)/m^2 \cdot day \cdot MPa$.

Because the gas-barrier layer (a) from the coating liquid (A) and the polyvalent metal compound-containing layer (b) are adjacent to each other in the gas-barrier multilayer structure (D), moisture treatment may be carried out to react the polyvalent metal compound in the polyvalent metal compound-containing layer (b) with the carboxyl groups remaining in the polyvalent metal-partially neutralized polycarboxylic acid polymer contained in the gas-barrier layer (a) from the coating liquid (A).

By carrying out the moisture treatment, the gas barrier properties of the gas-barrier multilayer structures (D) may be further enhanced.

Performing the moisture treatment means that the gas-barrier multilayer structure (D) in which the gas-barrier layer (a) from the coating liquid (A) and the polyvalent metal compound-containing layer (b) are adjacent to each other is exposed to moisture treatment conditions.

The moisture treatment conditions are preferably temperatures from 5 to 200° C., relative humidity from 20 to 100%, and periods from 1 second to 10 days, and more preferably temperatures from 20 to 150° C., relative humidity from 40 to 100%, and periods from 1 second to 5 days.

In view of storage of contents, the gas-barrier multilayer structures (D) after the moisture treatment preferably have an oxygen permeability in humid atmosphere at 30° C. and 80% RH of not more than 50 $cm^3$ $(STP)/m^2 \cdot day \cdot MPa$, more preferably not more than 10 $cm^3$ $(STP)/m^2 \cdot day \cdot MPa$, and particularly preferably not more than 5 $cm^3$ $(STP)/m^2 \cdot day \cdot MPa$.

The gas-barrier multilayer structures (D) may laminated with plastic films.

The plastic films to be laminated are not particularly limited and may be selected appropriately depending on purposes such as increased strength, sealing properties, easy opening from the sealed state, design, light shielding and moisture proofness. Examples of the films include films of the plastics described hereinabove as the materials of the supports. A single or two or more kinds of the plastic films may be used. The thickness of the plastic films is preferably 1 to 1000 µm, more preferably 5 to 500 µm, particularly preferably 5 to 200 µm, and most preferably 5 to 150 µm.

The gas-barrier multilayer structures (D) may be laminated with the plastic films in any order without limitation. From the viewpoint of handleability as products, preferred lamination embodiments include polyethylene terephthalate (support)/layer (a)/layer (b)/polyolefin (plastic film), nylon (support)/layer (a)/layer (b)/polyolefin (plastic film), polypropylene (support)/layer (a)/layer (b)/polyolefin (plastic film), paper (support)/layer (a)/layer (b)/polyolefin (plastic film), polyethylene terephthalate (support)/layer (a)/layer (b)/layer (a)/polyolefin (plastic film), polyethylene terephthalate (support)/layer (a)/layer (b)/nylon (plastic film)/polyolefin (plastic film), and polyethylene terephthalate (support)/layer (a)/layer (b)/metal-deposited nylon (plastic film)/polyolefin (plastic film). Of these, polyethylene terephthalate (support)/layer (a)/layer (b)/polyolefin (plastic film), polyethylene terephthalate (support)/layer (a)/layer (b)/nylon (plastic film)/polyolefin (plastic film), and polyethylene terephthalate (support)/layer (a)/layer (b)/metal-deposited nylon (plastic film)/polyolefin (plastic film) are more preferable, and polyethylene terephthalate (support)/layer (a)/layer (b)/polyolefin (plastic film), and polyethylene terephthalate (support)/layer (a)/layer (b)/nylon (plastic film)/polyolefin (plastic film) are particularly preferable.

<Gas-Barrier Shaped Articles>

The gas-barrier shaped articles of the present invention are comprised of the foregoing gas-barrier multilayer structures and have a shape selected from the group consisting of films, sheets, bottles, cups and trays.

The gas-barrier shaped articles may be obtained using the supports as described above that are in the form of films, sheets, bottles, cups or trays.

<Processes for Producing Gas-Barrier Multilayer Structures>

Hereinbelow, there will be described processes for producing the gas-barrier multilayer structures (C) and the gas-barrier multilayer structures (D).

<Processes for Producing Gas-Barrier Multilayer Structures (C)>

A process for producing the gas-barrier multilayer structures (C) includes applying the coating liquid (A) on at least one surface of the support and drying the liquid to form the gas-barrier layer (a).

The coating liquid (A) may be applied by any methods without limitation. Exemplary methods are dipping, spraying and application using a coater or a printer. Examples of the coaters and printers and the application methods therewith include methods using air knife coaters, direct gravure coaters, gravure offset printing machines, arc gravure coaters, reverse roll coaters such as top feed reverse coaters, bottom feed reverse coaters and nozzle feed reverse coaters, LIP coaters, bar coaters, bar reverse coaters and die coaters.

The coating liquid (A) may be dried by any methods without limitation. Exemplary methods include natural drying, oven drying at predetermined temperatures, and use of dryers included in the coaters such as arch dryers, floating dryers, drum dryers and infrared dryers. The drying conditions may be determined appropriately depending on the drying methods. In the case of oven drying for example, the drying temperature is preferably in the range of 40 to 300° C., more preferably 45 to 200° C., and particularly preferably 50 to 160° C. The drying time is preferably in the range of 0.5 second to 10 minutes, more preferably 1 second to 5 minutes, and particularly preferably 1 second to 1 minute.

<Processes for Producing Gas-Barrier Multilayer Structures (D)>

A process for producing the gas-barrier multilayer structures (D) includes applying the coating liquid (A) on at least one surface of the support; drying the liquid to form the gas-barrier layer (a); applying the coating liquid (B) containing the polyvalent metal compound on the gas-barrier layer (a); and drying the liquid to form the polyvalent metal compound-containing layer (b) on the gas-barrier layer (a). In another embodiment, a process includes applying the coating liquid (B) containing the polyvalent metal compound on at least one surface of the support; drying the liquid to form the polyvalent metal compound-containing layer (b); applying the coating liquid (A) on the polyvalent metal compound-containing layer (b); and drying the liquid to form the gas-barrier layer (a) on the polyvalent metal compound-containing layer (b).

The coating liquid (A) may be applied and dried by the methods as described with respect to the production of the gas-barrier multilayer structures (C). The coating liquid (B) may be applied and dried by methods similar to the methods for applying and drying the coating liquid (A) in the production of the gas-barrier multilayer structures (C).

The order in which the coating liquid (A) and the coating liquid (B) are applied may be such that the coating liquid (A) is applied on at least one surface of the support and is dried to form the gas-barrier layer (a), and the coating liquid (B) is applied and dried to form the polyvalent metal compound-containing layer (b); or may be such that the coating liquid (B) is applied on at least one surface of the support and is dried to form the polyvalent metal compound-containing layer (b), and the coating liquid (A) is applied and dried to form the gas-barrier layer (a).

Alternatively, the gas-barrier multilayer structures (D) may be produced without using the coating liquid (B), by depositing the polyvalent metal compound on the support or the gas-barrier layer (a) by gas-phase coating methods such as evaporation coating, sputtering and ion plating.

The gas-barrier multilayer structures (D) may be laminated with plastic films as described hereinabove. In this case, the plastic films may be laminated on at least one surface of the gas-barrier multilayer structures (D).

The plastic films may be laminated by known laminating methods without limitation. Exemplary methods include dry laminating methods, wet laminating methods and extrusion laminating methods.

EXAMPLES

The present invention will be described in detail hereinbelow without limiting the scope of the invention.

<Coating Liquids (A)>

(i) Preparation of Coating Liquids (A)

Example 1

Water weighing 100 g was added to 50 g of a 25 wt % aqueous polyacrylic acid solution (Aron A-10H manufactured by TOAGOSEI CO., LTD., number average molecular weight: 200,000). The mixture was stirred for 2 hours to give an 8.3 wt % aqueous polyacrylic acid solution.

Separately, 1.39 g of zinc oxide (a reagent manufactured by Wako Pure Chemical Industries, Ltd.) was added to 110.7 g of water and stirred therewith for 2 hours to give an aqueous zinc oxide dispersion.

While the aqueous polyacrylic acid solution was stirred, the aqueous zinc oxide dispersion was added. The mixture was stirred at room temperature for 2 days to afford a colorless and transparent aqueous solution of the polyacrylic acid partially neutralized with zinc.

To increase coating properties with respect to a support, 161.4 g of isopropyl alcohol (hereinafter, also referred to as IPA) (a reagent manufactured by Wako Pure Chemical Industries, Ltd.) as an organic solvent was added to the aqueous solution of the zinc-partially neutralized polyacrylic acid. The mixture was stirred for 2 hours. As a result, a coating liquid (A):A-1 was prepared in which the zinc-partially neutralized polyacrylic acid was dissolved and dispersed in the solvent mixture.

Table 1 shows the composition of the coating liquid (A): A-1, in detail, the content (wt %) of the zinc-partially neutralized polyacrylic acid (in Table 1, "partially neutralized polyacrylic acid) relative to 100 wt % of the coating liquid (A), the chemical equivalent of zinc relative to the carboxyl groups in the polyacrylic acid, and the wt % of IPA in the solvent mixture (water/IPA weight ratio).

The compositions of the coating liquids (A) of Examples 2 to 7 and Comparative Examples 1 and 2 are also shown in Table 1.

Example 2

Water weighing 100 g and sodium hydroxide (a reagent manufactured by Wako Pure Chemical Industries, Ltd.) weighing 0.137 g were added to 50 g of the 25 wt % aqueous polyacrylic acid solution used in Example 1. The mixture was stirred for 2 hours to give an 8.4 wt % aqueous solution of the polyacrylic acid partially neutralized with sodium.

Separately, 1.39 g of zinc oxide (a reagent manufactured by Wako Pure Chemical Industries, Ltd.) was added to 110.7 g of water and stirred therewith for 2 hours to give an aqueous zinc oxide dispersion.

While the aqueous solution of the sodium-partially neutralized polyacrylic acid was stirred, the aqueous zinc oxide dispersion was added. The mixture was stirred at room temperature for 2 days to afford a colorless and transparent aqueous solution of the polyacrylic acid partially neutralized with sodium and zinc.

Subsequently, 161.4 g of IPA (a reagent manufactured by Wako Pure Chemical Industries, Ltd.) as an organic solvent was added to the aqueous solution of the sodium/zinc-partially neutralized polyacrylic acid. The mixture was stirred for 2 hours. As a result, a coating liquid (A):A-2 was prepared in which the sodium/zinc-partially neutralized polyacrylic acid was dissolved and dispersed in the solvent mixture.

Example 3

The procedures of Example 2 were repeated except that sodium hydroxide was replaced by 0.192 g of potassium hydroxide (manufactured by Wako Pure Chemical Industries, Ltd.). As a result, a coating liquid (A):A-3 was prepared in which a potassium/zinc-partially neutralized polyacrylic acid was dissolved and dispersed in the solvent mixture.

Example 4

The procedures of Example 2 were repeated except that zinc oxide was replaced by 1.27 g of calcium hydroxide (manufactured by Wako Pure Chemical Industries, Ltd.). As a result, a coating liquid (A):A-4 was prepared in which a sodium/calcium-partially neutralized polyacrylic acid was dissolved and dispersed in the solvent mixture.

Example 5

Water weighing 40 g and sodium hydroxide (a reagent manufactured by Wako Pure Chemical Industries, Ltd.) weighing 0.137 g were added to 50 g of the 25 wt % aqueous polyacrylic acid solution used in Example 1. The mixture was stirred for 2 hours to give a 14.0 wt % aqueous solution of the polyacrylic acid partially neutralized with sodium.

Separately, 1.39 g of zinc oxide (a reagent manufactured by Wako Pure Chemical Industries, Ltd.) was added to 87.0 g of water and stirred therewith for 2 hours to give an aqueous zinc oxide dispersion.

While the aqueous solution of the sodium-partially neutralized polyacrylic acid was stirred, the aqueous zinc oxide dispersion was added. The mixture was stirred at room temperature for 2 days to afford a colorless and transparent aqueous solution of the polyacrylic acid partially neutralized with sodium and zinc.

Subsequently, 246.6 g of IPA (a reagent manufactured by Wako Pure Chemical Industries, Ltd.) as an organic solvent was added to the aqueous solution of the sodium/zinc-partially neutralized polyacrylic acid. The mixture was stirred for 2 hours. As a result, a coating liquid (A):A-5 was prepared in which the sodium/zinc-partially neutralized polyacrylic acid was dissolved and dispersed in the solvent mixture.

Example 6

The procedures of Example 2 were repeated except that the amount of zinc oxide (a reagent manufactured by Wako Pure Chemical Industries, Ltd.) was changed to 2.09 g. As a result, a coating liquid (A):A-6 was prepared in which a sodium/zinc-partially neutralized polyacrylic acid was dissolved and dispersed in the solvent mixture.

Example 7

Water weighing 100 g and sodium hydroxide (a reagent manufactured by Wako Pure, Chemical Industries, Ltd.) weighing 0.137 g were added to 50 g of the 25 wt % aqueous polyacrylic acid solution used in Example 1. The mixture was stirred for 2 hours to give an 8.4 wt % aqueous solution of the polyacrylic acid partially neutralized with sodium.

Separately, 2.09 g of zinc oxide (a reagent manufactured by Wako Pure Chemical Industries, Ltd.) was added to 231.1 g of water and stirred therewith for 2 hours to give an aqueous zinc oxide dispersion.

While the aqueous solution of the sodium-partially neutralized polyacrylic acid was stirred, the aqueous zinc oxide dispersion was added. The mixture was stirred at room temperature for 2 days to afford a colorless and transparent aqueous solution of the polyacrylic acid partially neutralized with sodium and zinc.

Subsequently, 41.0 g of IPA (a reagent manufactured by Wako Pure Chemical Industries, Ltd.) as an organic solvent was added to the aqueous solution of the sodium/zinc-partially neutralized polyacrylic acid. The mixture was stirred for 2 hours. As a result, a coating liquid (A):A-7 was prepared in which the sodium/zinc-partially neutralized polyacrylic acid was dissolved and dispersed in the solvent mixture.

Comparative Example 1

The procedures of Example 1 were repeated except that IPA was replaced by the equal amount of water. As a result, a coating liquid (A):A-8 was prepared in which a zinc-partially neutralized polyacrylic acid was dissolved.

Comparative Example 2

Water weighing 265.8 g and sodium hydroxide (a reagent manufactured by Wako Pure Chemical Industries, Ltd.) weighing 1.37 g were added to 50 g of the 25 wt % aqueous polyacrylic acid solution used in Example 1. The mixture was stirred for 2 hours to give a 4.4 wt % aqueous solution of the polyacrylic acid partially neutralized with sodium.

Subsequently, 106.5 g of IPA (a reagent manufactured by Wako Pure Chemical Industries, Ltd.) as an organic solvent was added to the aqueous solution of the sodium-partially neutralized polyacrylic acid. The mixture was stirred for 2 hours. As a result, a coating liquid (A):A-9 was prepared in which the sodium-partially neutralized polyacrylic acid was dissolved in the solvent mixture.

(ii) Evaluation of Coating Liquids (A)

The coating liquids (A) were evaluated with respect to appearance of the coating liquids (A), average particle diameter and proportion of dispersed particles, contact angle and coating properties with polypropylene resin, and contact angle and coating properties with urethane resin. The results are shown in Table 1.

The evaluations of the coating liquids (A) were made as follows.

(1) Appearance of Coating Liquids (A)

The appearance of the coating liquids (A) was visually observed.

(2) Average Particle Diameter of Dispersed Particles

The coating liquids (A) were analyzed with a submicron particle size analyzer (Coulter N4 Plus) manufactured by Beckman-Coulter, Inc. at a scattering angle of 62.5° to determine the average particle diameter of dispersed particles of the polyvalent metal-partially neutralized polyacrylic acid polymer.

In the measurement, the coating liquid (A) was diluted so that the content of the polyvalent metal-partially neutralized polycarboxylic acid polymer was 0.015 wt %.

(3) Proportion of Dispersed Particles

The coating liquid (A) was centrifuged at 25,000 rpm (centrifugal acceleration: about 50,000 G) for 150 minutes using a high speed refrigerated centrifuge (CX-250) manufactured by TOMY SEIKO CO., LTD., whereby the liquid was separated into a supernatant liquid and a white turbid precipitate of dispersed particles. The white turbid precipitate and the supernatant liquid were separated from each other and were each dried in vacuo at 90° C. for a day and then weighed. The weights obtained were applied to Equation (1) below to calculate the proportion of the particles of the polyvalent metal-partially neutralized polycarboxylic acid polymer dispersed in the coating liquid (A).

[Formula 2]

$$\text{Proportion of dispersed particles of polyvalent metal-partially neutralized polycarboxylic acid polymer [wt \%]} = \frac{\text{Dry weight of white turbid precipitate [g]}}{\left(\begin{array}{c}\text{Dry weight of white turbid precipitate [g]} + \\ \text{dry weight of supernatant liquid [g]}\end{array}\right)} \times 100 \text{ [wt \%]} \quad (1)$$

(4) Contact Angle of Coating Liquids (A) with Polypropylene Resin

The contact angle of the coating liquids (A) with respect to a polypropylene film (TORAYFAN NO 3300 manufactured by TORAY ADVANCED FILM CO., LTD., an unstretched polypropylene homopolymer film having a melting point of 160° C. and a density of 0.90 g/cm³) was measured using an automatic contact angle meter (CA-V) manufactured by KYOWA INTERFACE SCIENCE CO., LTD. In detail, the contact angle was measured by a θ/2 method 10 seconds after the coating liquid (A) (23° C.) was dropped on the polypropylene film (measurement temperature: 23° C.)

The coating properties of the coating liquids (A) with polypropylene films are excellent when the coating liquids (A) have a contact angle of 70° or less for the polypropylene film.

(5) Coating Properties of Coating Liquids (A) with Polypropylene Resin

The coating liquids (A) were each applied to a polypropylene film (TORAYFAN NO 3300 manufactured by TORAY ADVANCED FILM CO., LTD., an unstretched polypropylene homopolymer film having a melting point of 160° C. and a density of 0.90 g/cm³) with a bar coater and were dried. The appearance of the resultant coating was evaluated. The coating properties were rated "c" when visible large cissings occurred during the application or drying, and were rated "a" when there were no cissings and the appearance was good. The rating "b" was midway between the above ratings.

To evaluate the contact angle and coating properties of the coating liquids (A) with anchor coating layers used in Examples 8 to 14 and Comparative Examples 3 and 4 described later, the contact angle and coating properties of the coating liquids (A) with respect to a urethane resin layer (an anchor coating layer) were evaluated in (6) and (7) below.

(6) Contact Angle of Coating Liquids (A) with Urethane Resin Layer

The contact angle of the coating liquids (A) with respect to a urethane resin layer was measured using an automatic contact angle meter (CA-V) manufactured by KYOWA INTERFACE SCIENCE CO., LTD. In detail, the contact angle was measured by a θ/2 method 10 seconds after the coating liquid (A) (23° C.) was dropped on the urethane resin layer (measurement temperature: 23° C.)

The coating properties of the coating liquids (A) with urethane resin layers are excellent when the coating liquids (A) have a contact angle of 70° or less for the urethane resin layer.

(7) Coating Properties of Coating Liquids (A) with Urethane Resin Layer

The coating liquids (A) were each applied to a urethane resin with a bar coater and were dried. The appearance of the resultant coating was evaluated. The coating properties were rated "c" when visible large cissings occurred during the application or drying, and were rated "a" when there were no cissings and the appearance was good. The rating "b" was midway between the above ratings.

The urethane resin layer used in (6) and (7) above was prepared as follows. To 10 g of a dry-laminating urethane adhesive (DIC DRY TM LX-747, an adhesive for dry lamination and anchor coating manufactured by DIC Corporation), 1.5 g of a dry-laminating isocyanate curing agent (TM KX-75, a curing agent for dry lamination and anchor coating manufactured by DIC Corporation) and 185 g of ethyl acetate (a reagent manufactured by Wako Pure Chemical Industries, Ltd.) were added. The mixture was stirred for 30 minutes to give a urethane resin solution. A biaxially-stretched polyester film (hereinafter, also PET) (a support) was provided which was 12 µm in thickness and had a corona-treated surface. The above urethane resin solution was applied to the corona-treated surface using a Meyer bar coater and was dried at 90° C. for 30 seconds, thereby preparing a 0.1 µm thick urethane resin layer for the evaluation of contact angle and coating properties.

The evaluation results of the coating liquids (A) are set forth in Table 1.

TABLE 1

| | Coating liquid (A) | Content of partially neutralized polyacrylic acid [wt %] | Polyvalent metal compound | | Alkali metal compound | | Water/IPA weight ratio |
|---|---|---|---|---|---|---|---|
| | | | Metal | Chemical equivalent | Metal | Chemical equivalent | |
| Ex. 1 | A-1 | 3.3 | Zn | 0.2 | — | — | 6/4 |
| Ex. 2 | A-2 | 3.3 | Zn | 0.2 | Na | 0.02 | 6/4 |
| Ex. 3 | A-3 | 3.3 | Zn | 0.2 | K | 0.02 | 6/4 |
| Ex. 4 | A-4 | 3.3 | Ca | 0.2 | Na | 0.02 | 6/4 |
| Ex. 5 | A-5 | 3.3 | Zn | 0.2 | Na | 0.02 | 4/6 |
| Ex. 6 | A-6 | 3.5 | Zn | 0.3 | Na | 0.02 | 6/4 |
| Ex. 7 | A-7 | 3.5 | Zn | 0.3 | Na | 0.02 | 9/1 |
| Comp. Ex. 1 | A-8 | 3.3 | Zn | 0.2 | — | — | 10/0 |
| Comp. Ex. 2 | A-9 | 3.3 | — | — | Na | 0.2 | 7.4/2.6 |

| | Properties of coating liquid (A) | | | Properties with respect to polypropylene resin | | Properties with respect to urethane resin layer | |
|---|---|---|---|---|---|---|---|
| | Appearance of coating liquid | Average particle diameter of dispersed particles [nm] | Content of dispersed particles [wt %] | Contact angle [°] | Coating properties | Contact angle [°] | Coating properties |
| Ex. 1 | White turbid | 1000 | 20 | 30 | a | 20 | a |
| Ex. 2 | White turbid | 1000 | 20 | 30 | a | 20 | a |
| Ex. 3 | White turbid | 1000 | 20 | 30 | a | 20 | a |
| Ex. 4 | White turbid | 1000 | 20 | 30 | a | 20 | a |
| Ex. 5 | White turbid | 1000 | 20 | 25 | a | 15 | a |
| Ex. 6 | White turbid | 2000 | 50 | 30 | a | 20 | a |

TABLE 1-continued

| | | | | | | | | |
|---|---|---|---|---|---|---|---|---|
| Ex. 7 | White turbid | 700 | 50 | 40 | a | 30 | a | |
| Comp. Ex. 1 | Colorless transparent | Below 10*[1] | 0 | 100 | c | 80 | c | |
| Comp. Ex. 2 | Colorless transparent | Below 10*[1] | 0 | 40 | a | 30 | a | |

*[1] below the detection limit

<Gas-Barrier Multilayer Structures (C)>
(i) Preparation of Gas-Barrier Multilayer Structures (C)

Example 8

To 10 g of a dry-laminating urethane adhesive (DIC DRY TM LX-747, an adhesive for dry lamination and anchor coating manufactured by DIC Corporation), 1.5 g of a dry-laminating isocyanate curing agent (TM KX-75, a curing agent for dry lamination and anchor coating manufactured by DIC Corporation) and 185 g of ethyl acetate (a reagent manufactured by Wako Pure Chemical Industries, Ltd.) were added. The mixture was stirred for 30 minutes to give an anchor coating solution.

The anchor coating solution was applied to the corona-treated surface of the 12 μm thick PET using a Meyer bar coater and was dried at 90° C. for 30 seconds, thereby preparing a 0.1 μm thick anchor coating layer.

Subsequently, the coating liquid A-1 from Example 1 was applied to the anchor coating layer using a Meyer bar coater and was dried at 90° C. for 30 seconds, thereby preparing a zinc-partially neutralized polyacrylic acid layer (a gas barrier layer (a)) having a thickness of 0.3 μm.

A gas-barrier multilayer structure (C):C-1 manufactured as above was composed of PET (12 μm)/anchor coating layer (0.1 μm)/zinc-partially neutralized polyacrylic acid layer (0.3 μm).

Example 9

A gas-barrier multilayer structure (C):C-2 was obtained in the same manner as in Example 8, except that the coating liquid A-1 from Example 1 was replaced by the coating liquid A-2 from Example 2.

Example 10

A gas-barrier multilayer structure (C):C-3 was obtained in the same manner as in Example 8, except that the coating liquid A-1 from Example 1 was replaced by the coating liquid A-3 from Example 3.

Example 11

A gas-barrier multilayer structure (C):C-4 was obtained in the same manner as in Example 8, except that the coating liquid A-1 from Example 1 was replaced by the coating liquid A-4 from Example 4.

Example 12

A gas-barrier multilayer structure (C):C-5 was obtained in the same manner as in Example 8, except that the coating liquid A-1 from Example 1 was replaced by the coating liquid A-5 from Example 5.

Example 13

A gas-barrier multilayer structure (C):C-6 was obtained in the same manner as in Example 8, except that the coating liquid A-1 from Example 1 was replaced by the coating liquid A-6 from Example 6.

Example 14

A gas-barrier multilayer structure (C):C-7 was obtained in the same manner as in Example 8, except that the coating liquid A-1 from Example 1 was replaced by the coating liquid A-7 from Example 7.

Comparative Example 3

A gas-barrier multilayer structure (C):C-8 was obtained in the same manner as in Example 8, except that the coating liquid A-1 from Example 1 was replaced by the coating liquid A-8 from Comparative Example 1.

Comparative Example 4

A gas-barrier multilayer structure (C):C-9 was obtained in the same manner as in Example 8, except that the coating liquid A-1 from Example 1 was replaced by the coating liquid A-9 from Comparative Example 2.

(ii) Evaluation of Gas-Barrier Multilayer Structures (C)

The gas-barrier multilayer structures (C) were evaluated with respect to water resistance and oxygen permeability before and after soaking in cold water. The results are shown in Table 2.

The gas-barrier multilayer structures (C) were evaluated as follows.

(1) Measurement of Oxygen Permeability and Evaluation of Water Resistance

The oxygen permeability of the gas-barrier multilayer structures (C) was measured at 30° C. and 0% RH on both sides with use of oxygen permeability tester OX-TRAN 2/20 manufactured by MOCON (hereinafter, also the "oxygen permeability tester").

Subsequently, the gas-barrier multilayer structures (C) were soaked in cold water at 20° C. for 1 second. The soaked gas-barrier multilayer structures as specimens were tested again to determine the oxygen permeability. Based on the values obtained, the water resistance of the gas-barrier multilayer structures (C) was evaluated. The water resistance was rated "a" when the oxygen permeability was less than 50 cm$^3$ (STP)/m$^2$·day·MPa and was rated "b" when it was 50 cm$^3$ (STP)/m$^2$·day·MPa or above.

The oxygen permeability does not change before and after the soaking in cold water if the water resistance is good. In contrast, poor water resistance causes drastic increase in oxygen permeability after the soaking in cold water.

TABLE 2

| | Gas-barrier multilayer structure (C) | Constitution of gas-barrier multilayer structure (C) Constitution | Coating liquid (A) | Properties of gas-barrier multilayer structure (C) Oxygen permeability*[2] Before soaking in cold water | After soaking in cold water | Water resistance |
|---|---|---|---|---|---|---|
| Ex. 8 | C-1 | PET (12 μm)/anchor coating layer (0.1 μm)/zinc-partially neutralized polyacrylic acid layer (0.3 μm) | A-1 | 20 | 20 | a |
| Ex. 9 | C-2 | PET (12 μm)/anchor coating layer (0.1 μm)/sodium-zinc-partially neutralized polyacrylic acid layer (0.3 μm) | A-2 | 20 | 20 | a |
| Ex. 10 | C-3 | PET (12 μm)/anchor coating layer (0.1 μm)/potassium-zinc-partially neutralized polyacrylic acid layer (0.3 μm) | A-3 | 20 | 20 | a |
| Ex. 11 | C-4 | PET (12 μm)/anchor coating layer (0.1 μm)/sodium-calcium-partially neutralized polyacrylic acid layer (0.3 μm) | A-4 | 20 | 20 | a |
| Ex. 12 | C-5 | PET (12 μm)/anchor coating layer (0.1 μm)/sodium-zinc-partially neutralized polyacrylic acid layer (0.3 μm) | A-5 | 20 | 20 | a |
| Ex. 13 | C-6 | PET (12 μm)/anchor coating layer (0.1 μm)/sodium-zinc-partially neutralized polyacrylic acid layer (0.3 μm) | A-6 | 20 | 20 | a |
| Ex. 14 | C-7 | PET (12 μm)/anchor coating layer (0.1 μm)/sodium-zinc-partially neutralized polyacrylic acid layer (0.3 μm) | A-7 | 20 | 20 | a |
| Comp. Ex. 3 | C-8 | PET (12 μm)/anchor coating layer (0.1 μm)/zinc-partially neutralized polyacrylic acid layer (0.3 μm) | A-8 | 25 | 25 | a |
| Comp. Ex. 4 | C-9 | PET (12 μm)/anchor coating layer (0.1 μm)/sodium-partially neutralized polyacrylic acid layer (0.3 μm) | A-9 | 25 | 1800 | b |

*[2]Measurement conditions: 30° C., 0% RH, unit: [cm$^3$ (STP)/m$^2$ · day · MPa]

<Gas-Barrier Multilayer Structures (D)>
(i) Preparation of Gas-Barrier Multilayer Structures (D)

Example 15

A toluene dispersion of zinc oxide fine particles (a coating liquid (B) (zinc oxide-dispersed coating material ZR133 manufactured by SUMITOMO OSAKA CEMENT Co., Ltd.) which contained polyvalent metal compound and additive in a total amount of 33 wt % and in which the particle diameters ranged from 0.01 to 0.03 μm) was applied, with a Meyer bar coater, to the zinc-partially neutralized polyacrylic acid layer of the gas-barrier multilayer structure C-1 of Example 8 (PET (12 μm)/anchor coating layer (0.1 μm)/zinc-partially neutralized polyacrylic acid layer (0.3 μm)). The coating was dried at 90° C. for 30 seconds to form a 0.5 μm thick layer containing zinc oxide fine particles (a polyvalent metal compound-containing layer (b)).

A gas-barrier multilayer structure (D):D-1 manufactured as above was composed of PET (12 μm)/anchor coating layer (0.1 μm)/zinc-partially neutralized polyacrylic acid layer (0.3 μm)/zinc oxide fine particle-containing layer (0.5 μm).

Example 16

A gas-barrier multilayer structure (D):D-2 was obtained in the same manner as in Example 15, except that the gas-barrier multilayer structure C-1 from Example 8 was replaced by the gas-barrier multilayer structure C-2 from Example 9.

Example 17

A gas-barrier multilayer structure (D):D-3 was obtained in the same manner as in Example 15, except that the gas-barrier multilayer structure C-1 from Example 8 was replaced by the gas-barrier multilayer structure C-3 from Example 10.

Example 18

A gas-barrier multilayer structure (D):D-4 was obtained in the same manner as in Example 15, except that the gas-barrier multilayer structure C-1 from Example 8 was replaced by the gas-barrier multilayer structure C-4 from Example 11.

Example 19

A gas-barrier multilayer structure (D):D-5 was obtained in the same manner as in Example 15, except that the gas-barrier multilayer structure C-1 from Example 8 was replaced by the gas-barrier multilayer structure C-5 from Example 12.

Example 20

A gas-barrier multilayer structure (D):D-6 was obtained in the same manner as in Example 15, except that the gas-barrier multilayer structure C-1 from Example 8 was replaced by the gas-barrier multilayer structure C-6 from Example 13.

Example 21

A gas-barrier multilayer structure (D):D-7 was obtained in the same manner as in Example 15, except that the gas-barrier multilayer structure C-1 from Example 8 was replaced by the gas-barrier multilayer structure C-7 from Example 14.

Comparative Example 5

A gas-barrier multilayer structure (D):D-8 was obtained in the same manner as in Example 15, except that the gas-barrier multilayer structure C-1 from Example 8 was replaced by the gas-barrier multilayer structure C-8 from Comparative Example 3.

Comparative Example 6

A gas-barrier multilayer structure (D):D-9 was obtained in the same manner as in Example 15, except that the gas-barrier multilayer structure C-1 from Example 8 was replaced by the gas-barrier multilayer structure C-9 from Comparative Example 4.

(ii) Evaluation of Gas-Barrier Multilayer Structures (D)

The gas-barrier multilayer structures (D) were evaluated with respect to appearance after soaking in cold water, oxygen permeability before and after soaking in cold water, water resistance and oxygen permeability after moisture treatment. The results are shown in Table 3.

The gas-barrier multilayer structures (D) were evaluated as follows.

(1) Measurement of Oxygen Permeability and Evaluation of Water Resistance

The oxygen permeability of the gas-barrier multilayer structures (D) was measured at 30° C. and 0% RH on both sides with use of the oxygen permeability tester.

Subsequently, the gas-barrier multilayer structures (D) were soaked in cold water at 20° C. for 3 minutes. The soaked multilayer structures were visually observed. The rating "good" was given when the multilayer structure remained transparent, and the rating "clouded" was given when the multilayer structure became white turbid. The clouding means that the gas-barrier layer has no water resistance, that is, the transparency is maintained when the gas-barrier layer has water resistance. Subsequently, the gas-barrier multilayer structures were tested again to determine the oxygen permeability. Based on the values obtained, the water resistance of the gas-barrier multilayer structures (D) was evaluated. The water resistance was rated "a" when the oxygen permeability was less than 50 cm$^3$ (STP)/m$^2$·day·MPa and was rated "b" when it was 50 cm$^3$ (STP)/m$^2$·day·MPa or above.

The oxygen permeability does not change before and after the soaking in cold water if the water resistance is good. In contrast, poor water resistance causes drastic increase in oxygen permeability after the soaking in cold water.

Separately, the gas-barrier multilayer structures (D) were moisture treated at 30° C. and 80% RH for 24 hours. The moisture-treated gas-barrier multilayer structures as specimens were tested to determine the oxygen permeability at 30° C. and 80% RH on both sides.

TABLE 3

| | | Constitution of gas-barrier multilayer structure (D) | | Properties of gas-barrier multilayer structure (D) | | | | |
|---|---|---|---|---|---|---|---|---|
| | | | | | Oxygen permeability*3 | | | Oxygen permeability*4 |
| | Gas-barrier multilayer structure (D) | Constitution | Gas-barrier multilayer structure (C) | Appearance after soaking in cold water | Before soaking in cold water | After soaking in cold water | Water resistance | After moisture treatment |
| Ex. 15 | D-1 | PET (12 μm)/anchor coating layer (0.1 μm)/zinc-partially neutralized polyacrylic acid layer (0.3 μm)/zinc oxide fine particle-containing layer (0.5 μm) | C-1 | Good | 20 | 20 | a | 1 |
| Ex. 16 | D-2 | PET (12 μm)/anchor coating layer (0.1 μm)/sodium-zinc-partially neutralized polyacrylic acid layer (0.3 μm)/zinc oxide fine particle-containing layer (0.5 μm) | C-2 | Good | 20 | 20 | a | 1 |
| Ex. 17 | D-3 | PET (12 μm)/anchor coating layer (0.1 μm)/potassium-zinc-partially neutralized polyacrylic acid layer (0.3 μm)/zinc oxide fine particle-containing layer (0.5 μm) | C-3 | Good | 20 | 20 | a | 1 |
| Ex. 18 | D-4 | PET (12 μm)/anchor coating layer (0.1 μm)/sodium-calcium-partially neutralized polyacrylic acid layer (0.3 μm)/zinc oxide fine particle-containing layer (0.5 μm) | C-4 | Good | 20 | 20 | a | 1 |
| Ex. 19 | D-5 | PET (12 μm)/anchor coating layer (0.1 μm)/sodium-zinc-partially neutralized polyacrylic acid layer (0.3 μm)/zinc oxide fine particle-containing layer (0.5 μm) | C-5 | Good | 20 | 20 | a | 1 |
| Ex. 20 | D-6 | PET (12 μm)/anchor coating layer (0.1 μm)/sodium-zinc-partially neutralized polyacrylic acid layer (0.3 μm)/zinc oxide fine particle-containing layer (0.5 μm) | C-6 | Good | 20 | 20 | a | 1 |
| Ex. 21 | D-7 | PET (12 μm)/anchor coating layer (0.1 μm)/sodium-zinc-partially neutralized polyacrylic acid layer (0.3 μm)/zinc oxide fine particle-containing layer (0.5 μm) | C-7 | Good | 20 | 20 | a | 1 |
| Comp. Ex. 5 | D-8 | PET (12 μm)/anchor coating layer (0.1 μm)/zinc-partially neutralized polyacrylic acid layer (0.3 μm)/zinc oxide fine particle-containing layer (0.5 μm) | C-8 | Good | 25 | 25 | a | 3 |
| Comp. Ex. 6 | D-9 | PET (12 μm)/anchor coating layer (0.1 μm)/sodium-partially neutralized polyacrylic acid layer (0.3 μm)/zinc oxide fine particle-containing layer (0.5 μm) | C-9 | Clouded | 25 | 600 | b | 3 |

*3Measurement conditions: 30° C., 0% RH, unit: [cm$^3$ (STP)/m$^2$ · day · MPa]
*4Measurement conditions: 30° C., 80% RH, unit: [cm$^3$ (STP)/m$^2$ · day · MPa]

<Gas-barrier Multilayer Structures (D) Laminated with Plastic Film>
(i) Preparation of Gas-Barrier Multilayer Structures (D) Laminated with Plastic Film Example 22

To 10 g of a dry-laminating urethane adhesive (DIC DRY TM LX-747, an adhesive for dry lamination and anchor coating manufactured by DIC Corporation), 1.5 g of a dry-laminating isocyanate curing agent (TM KX-75, a curing agent for dry lamination and anchor coating manufactured by DIC Corporation) and 185 g of ethyl acetate (a reagent manufactured by Wako Pure Chemical Industries, Ltd.) were added. The mixture was stirred for 30 minutes to give a dry-laminating adhesive solution.

The dry-laminating adhesive solution was applied, with a Meyer bar coater, to the zinc oxide fine particle-containing layer of the gas-barrier multilayer structure D-1 of Example 15 (PET (12 µm)/anchor coating layer (0.1 µm)/zinc-partially neutralized polyacrylic acid layer (0.3 µm)/zinc oxide fine particle-containing layer (0.5 µm)). Thereafter, a 60 µm thick polypropylene film (hereinafter, also CPP) (unstretched polypropylene film ZK93FM manufactured by TORAY ADVANCED FILM CO.; LTD.) was laminated.

A CPP-laminated gas-barrier multilayer structure (D):D-1 (laminated with CPP) manufactured as above was composed of PET (12 µm)/anchor coating layer (0.1 µm)/zinc-partially neutralized polyacrylic acid layer (0.3 µm)/zinc oxide fine particle-containing layer (0.5 µm)/adhesive (2 µm)/CPP (60 µm).

Example 23

A CPP-laminated gas-barrier multilayer structure (D):D-2 (laminated with CPP) was obtained in the same manner as in Example 22, except that the gas-barrier multilayer structure D-1 from Example 15 was replaced by the gas-barrier multilayer structure D-2 from Example 16.

Example 24

A CPP-laminated gas-barrier multilayer structure (D):D-3 (laminated with CPP) was obtained in the same manner as in Example 22, except that the gas-barrier multilayer structure D-1 from Example 15 was replaced by the gas-barrier multilayer structure D-3 from Example 17.

Example 25

A CPP-laminated gas-barrier multilayer structure (D):D-4 (laminated with CPP) was obtained in the same manner as in Example 22, except that the gas-barrier multilayer structure D-1 from Example 15 was replaced by the gas-barrier multilayer structure D-4 from Example 18.

Example 26

A CPP-laminated gas-barrier multilayer structure (D):D-5 (laminated with CPP) was obtained in the same manner as in Example 22, except that the gas-barrier multilayer structure D-1 from Example 15 was replaced by the gas-barrier multilayer structure D-5 from Example 19.

Example 27

A CPP-laminated gas-barrier multilayer structure (D):D-6 (laminated with CPP) was obtained in the same manner as in Example 22, except that the gas-barrier multilayer structure D-1 from Example 15 was replaced by the gas-barrier multilayer structure D-6 from Example 20.

Example 28

A CPP-laminated gas-barrier multilayer structure (D):D-7 (laminated with CPP) was obtained in the same manner as in Example 22, except that the gas-barrier multilayer structure D-1 from Example 15 was replaced by the gas-barrier multilayer structure D-7 from Example 21.

Comparative Example 7

A CPP-laminated gas-barrier multilayer structure (D):D-8 (laminated with CPP) was obtained in the same manner as in Example 22, except that the gas-barrier multilayer structure D-1 from Example 15 was replaced by the gas-barrier multilayer structure D-8 from Comparative Example 5.

Comparative Example 8

A CPP-laminated gas-barrier multilayer structure (D):D-9 (laminated with CPP) was obtained in the same manner as in Example 22, except that the gas-barrier multilayer structure D-1 from Example 15 was replaced by the gas-barrier multilayer structure D-9 from Comparative Example 6.

(ii) Evaluation of Gas-Barrier Multilayer Structures (D) Laminated with Plastic Film The gas-barrier multilayer structures (D) laminated with plastic film were tested to evaluate the oxygen permeability after soaking in hot water at 90° C. for 1 hour. The results are set forth in Table 4.

The gas-barrier multilayer structures (D) laminated with plastic film were evaluated as follows.
(1) Measurement of Oxygen Permeability The CPP-laminated gas-barrier multilayer structures (D) were soaked in water at 90° C. for 1 hour. The soaked gas-barrier multilayer structures as specimens were tested with the oxygen permeability tester to determine the oxygen permeability at 30° C. and 80% RH on both sides.

TABLE 4

| | Constitution of gas-barrier multilayer structure (D) laminated with plastic film | | Properties of gas-barrier multilayer structure (D) laminated with plastic film | |
|---|---|---|---|---|
| | Constitution | Gas-barrier multilayer structure (D) | Oxygen permeability*5 after soaking at 90° C. for 1 hour | |
| Ex. 22 | PET (12 µm)/anchor coating layer (0.1 µm)/zinc-partially neutralized polyacrylic acid layer (0.3 µm)/zinc oxide fine particle-containing layer (0.5 µm)/adhesive agent (2 µm)/CPP (60 µm) | D-1 | 1 | |

TABLE 4-continued

| | Constitution of gas-barrier multilayer structure (D) laminated with plastic film | | Properties of gas-barrier multilayer structure (D) |
|---|---|---|---|
| | Constitution | Gas-barrier multilayer structure (D) | laminated with plastic film Oxygen permeability*[5] after soaking at 90° C. for 1 hour |
| Ex. 23 | PET (12 μm)/anchor coating layer (0.1 μm)/sodium-zinc-partially neutralized polyacrylic acid layer (0.3 μm)/zinc oxide fine particle-containing layer (0.5 μm)/adhesive agent (2 μm)/CPP (60 μm) | D-2 | 1 |
| Ex. 24 | PET (12 μm)/anchor coating layer (0.1 μm)/potassium-zinc-partially neutralized polyacrylic acid layer (0.3 μm)/zinc oxide fine particle-containing layer (0.5 μm)/adhesive agent (2 μm)/CPP (60 μm) | D-3 | 1 |
| Ex. 25 | PET (12 μm)/anchor coating layer (0.1 μm)/sodium-calcium-partially neutralized polyacrylic acid layer (0.3 μm)/zinc oxide fine particle-containing layer (0.5 μm)/adhesive agent (2 μm)/CPP (60 μm) | D-4 | 1 |
| Ex. 26 | PET (12 μm)/anchor coating layer (0.1 μm)/sodium-zinc-partially neutralized polyacrylic acid layer (0.3 μm)/zinc oxide fine particle-containing layer (0.5 μm)/adhesive agent (2 μm)/CPP (60 μm) | D-5 | 1 |
| Ex. 27 | PET (12 μm)/anchor coating layer (0.1 μm)/sodium-zinc-partially neutralized polyacrylic acid layer (0.3 μm)/zinc oxide fine particle-containing layer (0.5 μm)/adhesive agent (2 μm)/CPP (60 μm) | D-6 | 1 |
| Ex. 28 | PET (12 μm)/anchor coating layer (0.1 μm)/sodium-zinc-partially neutralized polyacrylic acid layer (0.3 μm)/zinc oxide fine particle-containing layer (0.5 μm)/adhesive agent (2 μm)/CPP (60 μm) | D-7 | 1 |
| Comp. Ex. 7 | PET (12 μm)/anchor coating layer (0.1 μm)/zinc-partially neutralized polyacrylic acid layer (0.3 μm)/zinc oxide fine particle-containing layer (0.5 μm)/adhesive agent (2 μm)/CPP (60 μm) | D-8 | 3 |
| Comp. Ex. 8 | PET (12 μm)/anchor coating layer (0.1 μm)/sodium-partially neutralized polyacrylic acid layer (0.3 μm)/zinc oxide fine particle-containing layer (0.5 μm)/adhesive agent (2 μm)/CPP (60 μm) | D-9 | 5 |

*[5]Measurement conditions: 30° C., 80% RH, unit: [cm$^3$ (STP)/m$^2$ · day · MPa]

The invention claimed is:

1. A coating liquid (A) consisting essentially of a solvent mixture of water and an organic solvent and a polycarboxylic acid polymer partially neutralized with a polyvalent metal wherein the polymer is both dissolved and dispersed as particles in the solvent mixture and wherein the particles dispersed account for 5 to 80 wt % of 100 wt % of the polycarboxylic acid polymer partially neutralized with a polyvalent metal.

2. The coating liquid (A) according to claim 1, wherein the particles dispersed have an average particle diameter of 500 to 4000 nm.

3. The coating liquid (A) according to claim 1, wherein the coating liquid (A) has a contact angle of not more than 70° with respect to a polypropylene resin (an unstretched polypropylene homopolymer film having a melting point of 158 to 162° C. and a density of 0.88 to 0.92 g/cm3) as measured by a θ/2 method.

4. The coating liquid (A) according to claim 1, wherein the polycarboxylic acid polymer partially neutralized with a polyvalent metal is a reaction product of a polycarboxylic acid polymer with 0.05 to 0.30 chemical equivalent of a polyvalent metal compound based on the carboxyl groups in the polycarboxylic acid polymer.

5. The coating liquid (A) according to claim 1, wherein the polycarboxylic acid polymer partially neutralized with a polyvalent metal is a reaction product of a polycarboxylic acid polymer with 0.01 to 0.35 chemical equivalent of an alkali metal compound based on the carboxyl groups in the polycarboxylic acid polymer and 0.05 to 0.75 chemical equivalent of a polyvalent metal compound based on the carboxyl groups in the polycarboxylic acid polymer (wherein the total of the alkali metal compound and the polyvalent metal compound does not exceed 1.00 chemical equivalent).

6. The coating liquid (A) according to claim 4, wherein the polycarboxylic acid polymer is a (co)polymer of at least one polymerizable monomer selected from acrylic acid, maleic acid, methacrylic acid and itaconic acid, or a mixture of such (co)polymers.

7. The coating liquid (A) according to claim 4, wherein the polyvalent metal compound is a calcium compound or a zinc compound.

8. The coating liquid (A) according to claim 5, wherein the alkali metal compound is a potassium compound or a sodium compound, and the polyvalent metal compound is a calcium compound or a zinc compound.

9. The coating liquid (A) according to claim 1, wherein the organic solvent is at least one organic solvent selected from the group consisting of C1-5 lower alcohols and C3-5 lower ketones, and the solvent mixture contains water at 20 to 95 wt % and the organic solvent at 80 to 5 wt % (wherein the total of water and the organic solvent is 100 wt %).

10. A gas-barrier multilayer structure comprising a support and a gas-barrier layer (a) on at least one surface of the support wherein the gas-barrier layer (a) is formed from a coating liquid (A) consisting essentially of a solvent mixture of water and an organic solvent and a polycarboxylic acid polymer partially neutralized with a polyvalent metal wherein the polymer is both dissolved and dispersed as particles in the solvent mixture and wherein the particles dispersed account for 5 to 80 wt % of 100 wt % of the polycarboxylic acid polymer partially neutralized with a polyvalent metal.

11. A gas-barrier multilayer structure comprising a support and a laminate unit on at least one surface of the support wherein the laminate unit comprises a gas-barrier layer (a) formed from a coating liquid (A) consisting essentially of a solvent mixture of water and an organic solvent and a polycarboxylic acid polymer partially neutralized with a polyvalent metal wherein the polymer is both dissolved and dispersed as particles in the solvent mixture and wherein the particles dispersed account for 5 to 80 wt % of 100 wt % of the polycarboxylic acid polymer partially neutralized with a polyvalent metal and a polyvalent metal compound-containing layer (b) in contact with each other.

12. The gas-barrier multilayer structure according to claim 11, wherein the polyvalent metal compound-containing layer (b) is formed from a coating liquid (B) containing a polyvalent metal compound.

13. A gas-barrier shaped article comprising the gas-barrier multilayer structure of claim 10, wherein said gas-barrier shaped article has a shape selected from the group consisting of films, sheets, bottles, cups and trays.

14. A process for producing gas-barrier multilayer structures, which process comprises applying a coating liquid (A) consisting essentially of a solvent mixture of water and an organic solvent and a polycarboxylic acid polymer partially neutralized with a polyvalent metal wherein the polymer is both dissolved and dispersed as particles in the solvent mixture and wherein the particles dispersed account for 5 to 80 wt % of 100 wt % of the polycarboxylic acid polymer partially neutralized with a polyvalent metal on at least one surface of a support and drying the liquid to form a gas-barrier layer (a).

15. A process for producing gas-barrier multilayer structures, which process comprises applying a coating liquid (A) consisting essentially of a solvent mixture of water and an organic solvent and a polycarboxylic acid polymer partially neutralized with a polyvalent metal wherein the polymer is both dissolved and dispersed as particles in the solvent mixture and wherein the particles dispersed account for 5 to 80 wt % of 100 wt % of the polycarboxylic acid polymer partially neutralized with a polyvalent metal on at least one surface of a support; drying the liquid to form a gas-barrier layer (a); applying a coating liquid (B) containing a polyvalent metal compound on the gas-barrier layer (a); and drying the liquid to form a polyvalent metal compound-containing layer (b) on the gas-barrier layer (a).

* * * * *

UNITED STATES PATENT AND TRADEMARK OFFICE
CERTIFICATE OF CORRECTION

PATENT NO. : 8,808,816 B2  Page 1 of 1
APPLICATION NO. : 12/312772
DATED : August 19, 2014
INVENTOR(S) : Yamazaki et al.

It is certified that error appears in the above-identified patent and that said Letters Patent is hereby corrected as shown below:

In the Claims

Column 30, Line 43, Claim 9, delete "C1-5lower" and insert -- C1-5 lower --

Column 30, Line 43, Claim 9, delete "C3-5lower" and insert -- C3-5 lower --

Signed and Sealed this
Sixteenth Day of December, 2014

Michelle K. Lee
*Deputy Director of the United States Patent and Trademark Office*